(12) United States Patent
Watson et al.

(10) Patent No.: US 7,239,465 B1
(45) Date of Patent: Jul. 3, 2007

(54) MULTIPLE SECTION HEAD ASSEMBLY FOR DUAL AZIMUTH RECORDING

(75) Inventors: Mark L. Watson, Louisville, CO (US); Anand V. Lakshmikumaran, Denver, CO (US); Jeffrey G. Villiard, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 305 days.

(21) Appl. No.: 10/609,514

(22) Filed: Jun. 30, 2003

(51) Int. Cl.
*G11B 5/02* (2006.01)
(52) U.S. Cl. .................................................. 360/55
(58) Field of Classification Search ................ 360/110, 360/63, 77.12, 121, 84, 53, 55, 61, 62, 64
See application file for complete search history.

(56) References Cited

U.S. PATENT DOCUMENTS

| | | | |
|---|---|---|---|
| 4,539,615 A * | 9/1985 | Arai et al. ................... 360/121 |
| 4,603,360 A * | 7/1986 | Fujiki et al. ................... 360/84 |
| 5,001,580 A | 3/1991 | Aranovsky et al. |
| 5,307,217 A | 4/1994 | Saliba |
| 5,371,638 A * | 12/1994 | Saliba ..................... 360/77.12 |
| 5,450,257 A | 9/1995 | Tran et al. |
| 5,523,904 A | 6/1996 | Saliba |
| 5,953,184 A | 9/1999 | Barber et al. |
| 5,982,711 A * | 11/1999 | Knowles et al. ......... 360/77.12 |
| 6,031,673 A * | 2/2000 | Fasen et al. ................... 360/53 |
| 6,038,098 A | 3/2000 | Tsuneki |
| 6,088,184 A | 7/2000 | Hu |
| 6,141,174 A | 10/2000 | Judge et al. |
| 6,222,698 B1 | 4/2001 | Barndt et al. |
| 6,285,519 B1 | 9/2001 | Goker |
| 6,331,920 B1 * | 12/2001 | Albrecht et al. ............... 360/63 |
| 6,366,422 B1 | 4/2002 | Daniel et al. |
| 6,970,314 B2 | 11/2005 | Watson et al. |
| 2002/0163752 A1 | 11/2002 | Peterson |
| 2005/0057846 A1 * | 3/2005 | Saliba ..................... 360/77.12 |

FOREIGN PATENT DOCUMENTS

| JP | 06012601 A * | 1/1994 |
|---|---|---|
| WO | WO 94/00839 | 1/1994 |

* cited by examiner

*Primary Examiner*—Tianjie Chen
(74) *Attorney, Agent, or Firm*—Brooks Kushman P.C.

(57) ABSTRACT

A magnetic head assembly for writing multiple tracks to a tape that travels in a first direction is provided. The assembly includes a first head section for writing a first subset of the tracks, and a second head section for writing a second subset of the tracks. Furthermore, one head section is canted with respect to a plane that is transverse to the first direction, such that the head sections write two adjacent tracks at different angles with respect to the plane.

32 Claims, 2 Drawing Sheets

MULTIPLE SECTION HEAD ASSEMBLY FOR DUAL AZIMUTH RECORDING

BACKGROUND OF THE INVENTION

1. Field of the Invention

The invention relates to a read/write head assembly for use with magnetic tape.

2. Background Art

A linear recording system includes a read/write head that reads and writes data on a magnetic tape, and a servo system that positions the head with respect to the tape. Data throughput may be increased by increasing the number of data channels on the head, which results in an increase in the number of data tracks that can be written across the width of the tape. However, the maximum data throughput achievable is limited by the decrease in read back signal to noise ratio (SNR) and the increased demands on the servo system as track width is reduced. For a typical linear recording system, the effective read width has to be proportionally smaller than the effective write width in order to provide the servo system with a sufficient margin to accurately position a read sensor of the head within a previously written track during a read-back operation. Thus, as track width is reduced, the effective read width has to be proportionally reduced, resulting in a decrease in read signal and, therefore, loss of SNR.

SUMMARY OF THE INVENTION

Under the invention, a head assembly for writing multiple tracks to a tape that travels in a first direction is provided. The assembly includes a first head section for writing a first subset of the tracks, and a second head section for writing a second subset of the tracks. Furthermore, one head section is canted with respect to a plane that is transverse to the first direction, such that the head sections write two tracks at different angles with respect to the plane.

Further under the invention, a data recording system for use with a tape that travels in a first direction includes a head assembly having a first head section for accessing a first subset of data channels, and a second head section for accessing a second subset of data channels. One head section of the head assembly is canted with respect to a plane that is transverse to the first direction. The system further includes an actuator arrangement for positioning the head assembly such that the first and second head sections respectively access the first subset of data channels and the second subset of data channels concurrently.

DETAILED DESCRIPTION OF THE PREFERRED EMBODIMENT(S)

Figure 1:
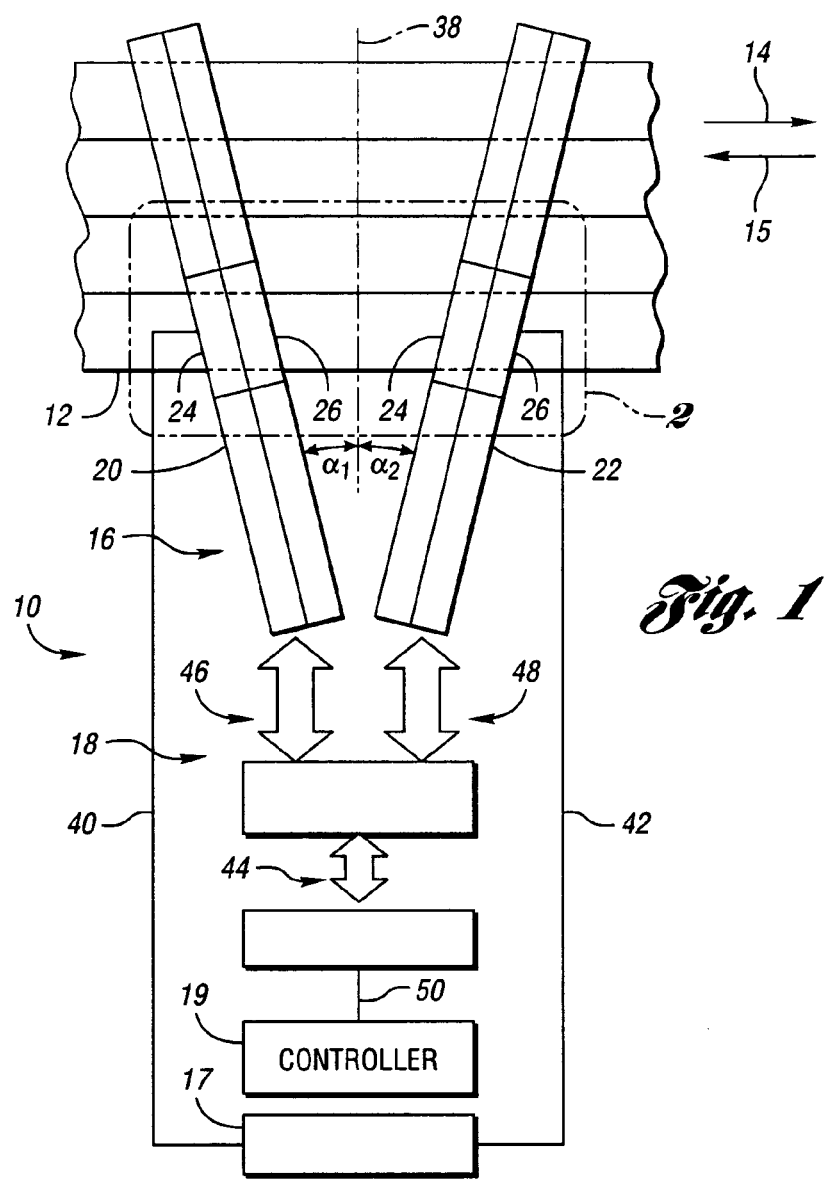
FIG. 1 is a schematic view of a data recording system according to the invention for use with magnetic tape, wherein the system includes a multiple section read/write head assembly.

FIG. 1 shows a data recording system 10, such as a tape drive, for use with a magnetic tape 12 that travels longitudinally in a first direction 14 and second direction 15. In accordance with the invention, the system 10 includes a multiple section magnetic head assembly, such as read/write head assembly 16, read/write electronics, such as read/write electronic unit 17, in electrical communication with the head assembly 16, an actuator arrangement 18 for positioning the head assembly 16 with respect to the tape 12, and a controller 19 for controlling operation of the actuator arrangement 18.

The head assembly 16 includes multiple head sections, such as two or more head sections, and is configured to write multiple longitudinal tracks to the tape 12 and read the tracks from the tape 12. While the head assembly 16 may include any suitable number of head sections, in the embodiment shown in FIG. 1, the head assembly includes a first head section 20 for writing a first subset of the tracks, and a second head section 22 for writing a second subset of the tracks. Each head section 20 and 22 includes one or more write elements (not shown) arranged in one or more modules for writing tracks, and may also include one or more read elements (not shown) arranged in one or more modules for reading data from the tracks. For example, each head section 20 and 22 may be configured as a two bump design in which two modules, or portions thereof, are arranged in either a read/write or write/read configuration, or a three bump design in which three modules, or portions thereof, are arranged in either a read/write/read or write/read/write configuration. With such configurations, read-after-write operations may be performed to verify that data was written correctly to the tape 12.

In the embodiment shown in FIG. 1, each head section 20 and 22 includes two modules 24 and 26, and each module 24 and 26 has a merged pole/shield configuration. More specifically, referring to FIG. 3, each module 24 and 26 includes a pole 28; a write gap 30, which includes a write element; a merged pole/shield 32; a read sensor or element 34; and a shield 36. With such a configuration, each module 24 and 26 may be used to perform a read or a write operation. As a result, each head section 20 and 22 may perform read-after-write operations regardless of the direction of tape travel.

Figure 2:
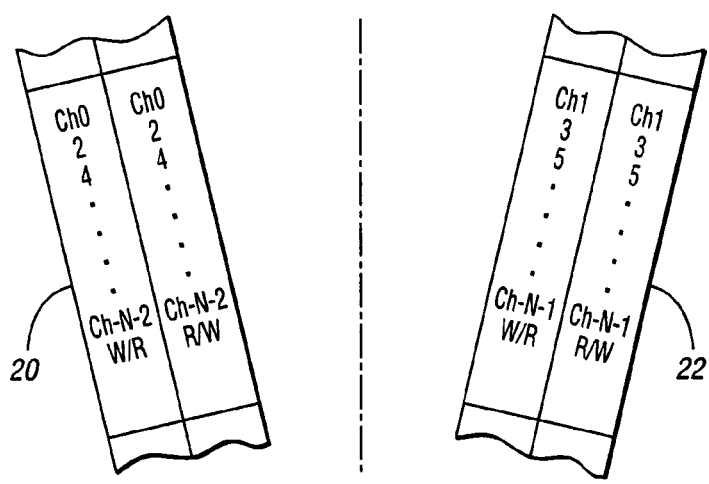
FIG. 2 is an enlarged schematic view of a portion of the head assembly.

Furthermore, the head sections 20 and 22 are arranged to write the tracks on tape 12 such that at least a portion of the first subset of tracks is interleaved with at least a portion of the second subset of tracks. In the embodiment shown in FIGS. 1–3, the head sections 20 and 22 are configured to write the tracks on tape 12 such that the first subset (identified as 37a in FIG. 3) of tracks is entirely interleaved with the second subset (identified as 37b in FIG. 3) of tracks, such that adjacent tracks are each written by a different head section 20 or 22. For example, referring to FIG. 2, data channels of the head assembly 16 may be interleaved between the head sections 20 and 22, such that each head section 20 and 22 may be aligned to access a subset of the data channels to write data from the subset of data channels to the tape 12 and/or to read data from the tape 12 to the subset of data channels. More specifically, if head assembly 16 includes N data channels, the data channels may be interleaved between head sections 20 and 22 such that the first head section 20 accesses a first subset of data channels including channels 0, 2, 4, . . . , N–2, and the second head section 22 accesses a second subset of data channels including channels 1, 3, 5, . . . , N–1. Furthermore, the system 10 is configured such that the first and second head sections 20 and 22, respectively, may be aligned to respectively access the first and second data channels concurrently.

In accordance with the invention, at least one head section 20 and 22 is canted with respect to a plane 38 that is transverse or perpendicular to the first direction 14 such that the head sections 20 and 22 write adjacent tracks on tape 12 at different angles with respect to the plane 38. In the embodiment shown in FIGS. 1 and 3, for example, each head section 20 and 22 is canted with respect to the plane 38, and the head sections 20 and 22 are canted in opposite directions. As another example, the head sections 20 and 22 may be canted in the same direction, but at different angles. Furthermore, each head section 20 and 22 may be canted at any suitable angle, such as an angle greater than 0°, and more particularly an angle greater than 4°. In one embodiment of the invention, the first head section 20 may be canted at an angle $\alpha_1$ in the range of 4 to 30°, and the second head section 22 may be canted at an angle $\alpha_2$ in the range of 4 to 30°. While not required, the head sections 20 and 22 are preferably canted at equal angles, but in opposite directions.

In addition, each head section 20 and 22 includes a contour that is configured to maintain head/tape contact over the read and/or write elements involved in a particular read or write operation. More specifically, each contour is configured to accommodate relatively large variations in tape wrap angle that may occur due to the canted angle of the head sections 20 and 22. For example, each head section 20 and 22 may be provided with a contour having one or more transverse slots, such as disclosed in U.S. Pat. No. 5,953,184, which is assigned to the assignee of the present application and is hereby incorporated in its entirety herein.

Referring to FIG. 1, the head sections 20 and 22 are in electrical communication with the read/write electronic unit 17, which is operative to provide data to be written by the head assembly 16 and to receive data read from the head assembly 16. For example, in the embodiment shown in FIG. 1, the head sections 20 and 22 are connected to the read/write electronic unit 17 with flex cables 40 and 42, which may also be referred to as "flexes." Alternatively, each head section 20 and 22 may be connected to the read/write electronic unit 17 with multiple flex cables, such as one flex cable for each module 24 and 26.

Additional details regarding multiple section read/write head assemblies are disclosed in co-pending application Ser. No. 10/163,988. That entire application is hereby incorporated by reference.

Referring to FIG. 1, the actuator arrangement 18 is operative to position the head sections 20 and 22 with respect to the tape 12. While the actuator arrangement 18 may have any suitable configuration, in the embodiment shown in FIG. 1, the actuator arrangement 18 includes a course position actuator 44 for aligning the head assembly 16 with respect to a data band of the tape 12, and first and second fine position actuators 46 and 48, respectively, for aligning the first and second head sections 20 and 22, respectively, within the data band. As another example, the actuator arrangement 18 may include a separate course position actuator for each head section 20 and 22, such that each head section 20 and 22 may be positioned by a separate course position actuator and a fine position actuator 46 or 48. As yet another example, the actuator arrangement 18 may be provided without any separate course position actuators, and the fine position actuators 46 and 48 may be configured to perform course and fine positioning operations.

The controller 19 is in electrical communication with the actuator assembly 18 via electrical connection 50. Furthermore, the controller is operative to provide control information to the actuator assembly 18 so as to control positioning of the head assembly 16. The controller 19 may also include the read/write electronic unit 17.

With the configuration described above, tracks may be written to the tape 12 as the tape 12 travels in either the first direction 14 or the second direction 15. For example, referring to FIG. 3, when the tape 12 travels in the first direction 14, first head section 20 may be used to write one track, such as the top most track shown in FIG. 3, and the second head section 22 may be used to write a track spaced away from the top most track, such as immediately adjacent or below the top most track. Next, the tape 12 may be moved in the second direction 15, and the head assembly 16 may be re-positioned by the actuator arrangement 18 such that the first head section 20 writes an additional track adjacent to the track written by the second head section 22 in the previous step, and the second head section 22 writes an additional track adjacent to the additional track written by the first head section 20. This process may be repeated until the tape 12 or particular data band is full.

If each head section 20 and 22 includes multiple write elements, then the first head section 20 may be used to write certain tracks, such as every sixth track (i.e., tracks 1, 7, 13, . . . ), during each passage of the tape 12 in a certain direction, which is referred to as a wrap, and the second head section 22 may be used to write a track adjacent to each track written by the first head section 20 during the particular wrap. After each wrap, the head assembly 16 may be repositioned by the actuator arrangement 18 such that the first head section 20 may write an additional track immediately adjacent or below each track written by the second head section 22 during the previous wrap, and the second head section 22 may concurrently write an additional track immediately adjacent to each additional track being written by the first head section 20. With such a process, after three wraps of the tape 12, the first head section 20 will have written tracks 1, 3, 5, 7, . . . , and the second head section 22 will have written tracks 2, 4, 6, 8, etc.

Figure 3:
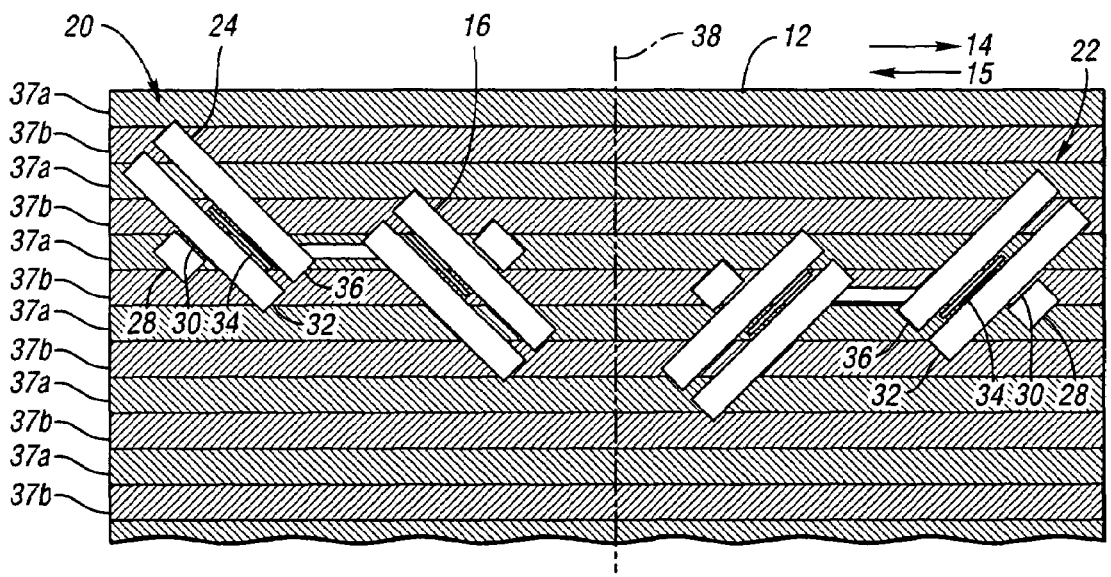
FIG. 3 is a schematic view of the head assembly and tape showing multiple tracks written on the tape, wherein adjacent tracks are written at different angles.

With the system 10 of the invention, adjacent tracks are written at different azimuth angles on the tape 12, as shown in FIG. 3. Consequently, during a read operation performed by a respective read element 34, data written in tracks adjacent to a particular track being read will not be detected by the read element 34. The data written in such adjacent tracks will not be detected as the output voltage due to the transitions recorded in these tracks is reduced by azimuth loss. This reduction in detection may be enhanced by optimal selection of the effective read sensor dimensions, the written track width and the recorded frequency spectrum.

As a result, the width of the read elements 34 can be increased such that each read element 34 is wider than each track written to the tape 12. Thus, the effective read width for the system 10 is determined by the width of the tracks written to the tape 12 and not the width of the read elements 34.

Because the read back signal to noise ratio for the system 10 is determined by the write width, instead of the read width as with typical prior systems, the write width for the system 10 can be reduced, thereby enabling a significant increase in track density. Furthermore, because the actuator arrangement 18 does not need to locate a particular read element 34 within the width of a track to be read, the track mis-registration requirements for the system 10 may be significantly reduced.

Figure 4:
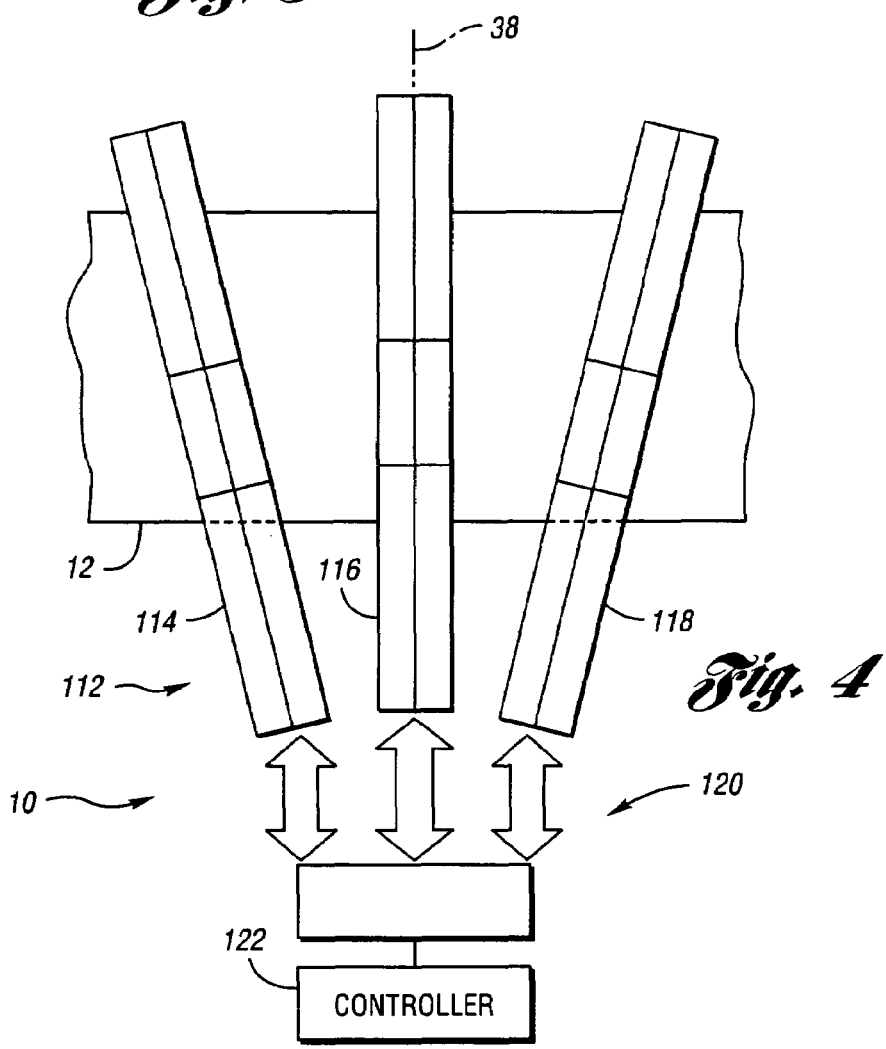
FIG. 4 is a schematic view of a second embodiment of a data recording system according to the invention.

FIG. 4 shows a second embodiment 110 of a data recording system according to the invention for use with tape 12. The system 110 includes a multiple section read/write head assembly 112 having first, second and third head sections 114, 116 and 118, respectively. In this embodiment, head sections 114 and 118 are canted in opposite directions with respect to plane 38, while head section 116 is aligned with plane 38.

The system 110 also includes an actuator arrangement 120 for positioning each head section 114, 116 and 118 with respect to the tape 12. Furthermore, the system 110 includes a controller 122 that may control operation of the actuator arrangement 120, provide data to the head assembly 112 for write operations, and receive data from the head assembly 112 during read operations. Alternatively, system 110 may include separate read/write electronics for transmitting and receiving data to the head assembly 112 during read and write operations.

With the configuration of the head assembly 112, adjacent tracks may be written to the tape 12 at different angles corresponding to the angles of the head sections 114, 116 and 118. For example, tracks 1, 4, 7, . . . may be written by head section 114, tracks 2, 5, 8, . . . may be written by head section 116, and tracks 3, 6, 9, . . . may be written by head section 118.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A head assembly for use with a tape that travels in a first direction, the head assembly being configured to write multiple tracks to the tape, the assembly comprising:
    a first head section for writing a first subset of the tracks; and
    a second head section for writing a second subset of the tracks;
    wherein one head section is canted with respect to a plane that is transverse to the first direction, the head sections are configured to concurrently write two separate tracks at different angles with respect to the plane, each head section is independently positionable and includes at least one write element, each write element of the first head section is configured to write tracks at a first angle with respect to the plane, and each write element of the second head section is configured to write tracks at a second angle with respect to the plane, and wherein the second angle is different than the first angle.

2. The head assembly of claim 1 wherein the one head section is canted at an angle of at least four degrees.

3. The head assembly of claim 1 wherein the one head section is canted at an angle in the range of four to thirty degrees.

4. The head assembly of claim 1 wherein each head section is canted with respect to the plane.

5. The head assembly of claim 4 wherein the head sections are canted in opposite directions.

6. The head assembly of claim 5 wherein the head sections are each canted at an angle of at least four degrees.

7. The head assembly of claim 1 wherein the head sections are configured to write the tracks such that a portion of the second subset of tracks is interleaved with respect to a portion of the first subset of tracks.

8. The head assembly of claim 1 further comprising a third head section for writing a third subset of tracks, wherein two of the head sections are canted with respect to the plane.

9. The head assembly of claim 8 wherein each of the first, second and third head sections is configured to write a track at a different angle with respect to the plane.

10. The head assembly of claim 1 wherein the first head section and the second head section are configured to respectively write the first subset of tracks and the second subset of tracks concurrently, such that the first subset of tracks includes multiple tracks written at the first angle, and the second subset of tracks includes multiple tracks written at the second angle.

11. The head assembly of claim 1 wherein the head sections are configured to write the two tracks such that the two tracks are adjacent to each other.

12. The head assembly of claim 1 wherein each head section is configured to perform read-after-write operations when the tape travels in the first direction, as well as when the tape travels in a second direction opposite the first direction.

13. A read/write head assembly for use with a tape that travels in a first direction, the assembly being configured to write multiple tracks to the tape and read the tracks from the tape, the assembly comprising:
    multiple head sections that are each configured to write a subset of the tracks to the tape such that a portion of each subset of tracks is interleaved with a portion of another subset of tracks, each head section being independently positionable and including at least one write element;
    wherein at least one write element is canted with respect to a plane that is transverse to the first direction, such that the head sections write adjacent tracks at different angles with respect to the plane, and wherein the head sections are configured to concurrently write tracks to different portions of the tape and at different angles with respect to the plane.

14. The head assembly of claim 13 wherein at least one head section is moveable in a direction transverse to the first direction.

15. The head assembly of claim 13 wherein each head section is configured to perform read-after-write operations when the tape travels in the first direction, as well as when the tape travels in a second direction opposite the first direction.

16. The head assembly of claim 13 wherein the multiple head sections include three head sections that are each configured to write a track at a different angle with respect to the plane, such that the three head sections are configured to write tracks at three different angles.

17. The system of claim 13 wherein the multiple head sections include first and second head sections, and wherein all of each track written by the first head section extends at a first angle with respect to the plane, and all of each track written by the second head section extends a second angle with respect to the plane, the first angle being different than the second angle.

18. The system of claim 13 wherein the multiple head sections include three head sections.

19. A data recording system for use with a tape that travels in a first direction, the system comprising:
    a head assembly including a first head section for accessing a first subset of data channels, and a second head section for accessing a second subset of data channels, each head section including a write element, wherein one write element is canted with respect to a plane that is transverse to the first direction; and
    an actuator arrangement for independently positioning the head sections such that the first and second head sections respectively access the first subset of data channels and the second subset of data channels concurrently.

20. The system of claim 19 wherein a portion of the first subset of data channels is interleaved with respect to a portion of the second subset of data channels.

21. The system of claim 19 wherein the actuator arrangement comprises a first fine position actuator that aligns the first head section, and a second fine position actuator that aligns the second head section.

22. The system of claim 19 wherein the first subset of data channels and the second subset of data channels are in the same data band, and wherein the actuator arrangement comprises a course position actuator that aligns the head assembly to the data band, a first fine position actuator that aligns the first head section to access the first subset of data channels within the data band, and a second fine position actuator that aligns the second head section to access the second subset of data channels within the data band.

23. The system of claim 19 wherein the one write element is canted at an angle of at least four degrees.

24. The system of claim 19 wherein the one write element is canted at an angle in the range of four to thirty degrees.

25. The system of claim 19 wherein each write element is canted with respect to the plane.

26. The system of claim 25 wherein the write element of the first head section and the write element of the second head section are canted in opposite directions.

27. The system of claim 26 wherein the write elements are each canted at an angle of at least four degrees.

28. The system of claim 19 further comprising a third head section for accessing a third subset of data channels and including a write element for writing data tracks to the tape, each head section being independently positionable.

29. The system of claim 19 wherein the head sections are configured to concurrently write tracks to the tape at different angles with respect to the plane when the tape travels in the first direction, and wherein the actuator arrangement is configured to reposition the head sections with respect to the tape so that the head sections may concurrently write additional tracks to the tape when the tape travels in a second direction opposite the first direction.

30. The system of claim 29 wherein each head section is configured to perform read-after-write operations when the tape travels in the first direction, as well as when the tape travels in the second direction.

31. The system of claim 19 wherein the head assembly further includes a third head section, and two of the head sections are canted with respect to the plane, and wherein the first, second and third head sections are each configured to write a track at a different angle with respect to the plane.

32. The system of claim 19 wherein the head sections are configured to concurrently write tracks to the tape at different angles with respect to the plane.

* * * * *